US012552888B2

(12) United States Patent
Harada et al.

(10) Patent No.: US 12,552,888 B2
(45) Date of Patent: Feb. 17, 2026

(54) CURABLE RESIN COMPOSITION AND DISPLAY DEVICE

(71) Applicant: SUMITOMO CHEMICAL COMPANY, LIMITED, Tokyo (JP)

(72) Inventors: Yoshihiro Harada, Osaka (JP); Yoshifumi Komatsu, Osaka (JP); Masayoshi Tokuda, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 901 days.

(21) Appl. No.: 17/778,748

(22) PCT Filed: Dec. 23, 2020

(86) PCT No.: PCT/JP2020/048160
§ 371 (c)(1),
(2) Date: May 20, 2022

(87) PCT Pub. No.: WO2021/132331
PCT Pub. Date: Jul. 1, 2021

(65) Prior Publication Data
US 2022/0411551 A1     Dec. 29, 2022

(30) Foreign Application Priority Data

Dec. 26, 2019  (JP) ................................. 2019-236575

(51) Int. Cl.
| | |
|---|---|
| *C08F 220/14* | (2006.01) |
| *B82Y 20/00* | (2011.01) |
| *B82Y 30/00* | (2011.01) |
| *B82Y 40/00* | (2011.01) |
| *C08F 2/50* | (2006.01) |
| *C08F 220/06* | (2006.01) |
| *C08F 220/18* | (2006.01) |
| *C08K 5/06* | (2006.01) |
| *C08K 5/13* | (2006.01) |
| *C08K 5/33* | (2006.01) |
| *G02F 1/017* | (2006.01) |

(52) U.S. Cl.
CPC .............. *C08F 220/14* (2013.01); *C08F 2/50* (2013.01); *C08F 220/06* (2013.01); *C08F 220/1811* (2020.02); *C08K 5/06* (2013.01); *C08K 5/13* (2013.01); *C08K 5/33* (2013.01); *G02F 1/01791* (2021.01); *B82Y 20/00* (2013.01); *B82Y 30/00* (2013.01); *B82Y 40/00* (2013.01)

(58) Field of Classification Search
CPC ................. C09K 11/025; C08F 220/14; C08F 220/1811; C08F 5/05; C08F 2/50; G02F 1/01791; C08K 5/13; C08K 5/33
See application file for complete search history.

(56) References Cited

U.S. PATENT DOCUMENTS

| | | | |
|---|---|---|---|
| 5,281,449 | A | 1/1994 | Iwasawa et al. |
| 2011/0053091 | A1 | 3/2011 | Hiroi et al. |
| 2015/0037588 | A1 | 2/2015 | Kato |
| 2017/0059988 | A1 | 3/2017 | Paek et al. |
| 2021/0040383 | A1 | 2/2021 | Yahata et al. |

FOREIGN PATENT DOCUMENTS

| | | | |
|---|---|---|---|
| CN | 10656389 | * | 4/2017 |
| CN | 106569389 | * | 4/2017 |
| CN | 106795228 A | | 5/2017 |
| CN | 109997079 A | | 7/2019 |
| CN | 110964528 A | | 4/2020 |
| JP | 2006-290999 A | | 10/2006 |
| JP | 2013-033276 A | | 2/2013 |
| JP | 2013-064989 A | | 4/2013 |
| JP | 2013-203955 A | | 10/2013 |
| JP | 2016-065178 A | | 4/2016 |
| JP | 2018-131612 | * | 8/2016 |
| JP | 2018-131614 | * | 8/2016 |
| JP | 2016-157118 A | | 9/2016 |
| JP | 2018-123274 A | | 8/2018 |
| JP | 2019-081863 A | | 5/2019 |
| JP | 2019-139240 A | | 8/2019 |
| JP | 2019-537064 A | | 12/2019 |
| KR | 10-2017-0043084 | * | 4/2017 |
| KR | 10-2017-0043087 | * | 4/2017 |
| TW | 201829726 A | | 8/2018 |
| TW | 201923464 A | | 6/2019 |
| WO | WO-2016/035602 A1 | | 3/2016 |
| WO | WO 2016/035603 | * | 3/2016 |
| WO | WO-2016/035603 A1 | | 3/2016 |
| WO | WO 2018-92028 | * | 5/2018 |
| WO | WO 2018/93028 | * | 5/2018 |
| WO | WO-2019/189495 A1 | | 10/2019 |

OTHER PUBLICATIONS

Translation for WO 2016/035603, Mar. 10, 2016.*
Tranalstion for WO 2016/035603, Mar. 10, 2016.*
European Extended Search Report issued in corresponding European Patent Application No. 20906816.2 dated Jan. 4, 2024 (6 pages).
European Extended Search Report issued in corresponding European Patent Application No. 20906859.2 dated Jan. 4, 2024 (6 pages).
Office Action issued in corresponding Chinese Patent Application No. 202080089807.0 dated Dec. 25, 2023 (27 pages).
International Searching Authority, "International Search Report," issued in connection with International Patent Application No. PCT/JP2020/048161, dated Feb. 9, 2021.

(Continued)

Primary Examiner — C Melissa Koslow
(74) Attorney, Agent, or Firm — Foley & Lardner LLP

(57) ABSTRACT

A curable resin composition contains quantum dots (A), a resin (B), a photopolymerizable compound (C), a photopolymerization initiator (D), an antioxidant (E), a leveling agent (F), and a solvent (G), wherein the resin (B) has a weight-average molecular weight in terms of polystyrene of less than 10000 and an acid value of 90 mg KOH/g or more and 150 mg KOH/g or less.

8 Claims, No Drawings

(56) References Cited

OTHER PUBLICATIONS

International Searching Authority, "Written Opinion," issued in connection with International Patent Application No. PCT/JP2020/048161, dated Feb. 9, 2021.
Translation of International Searching Authority, "Written Opinion," issued in connection with International Patent Application PCT/JP2020/048160, dated Mar. 16, 2021.
Office Action issued in corresponding Taiwanese Patent Application No. 109145393 dated Apr. 24, 2024 (21 pages).
Office Action, dated Aug. 8, 2023, issued in corresponding Japanese Patent Application No. 2019-236576 (7 pages).
Office Action issued in corresponding Chinese Patent Application No. 202080089604. 1 dated Mar. 8, 2024 (9 pages).
Office Action issued in corresponding Taiwanese Patent Application No. 109145378 dated Feb. 6, 2024 (8 pages).
Office Action issued in corresponding Japanese Patent Application No. 2019-236576 dated Sep. 26, 2023 (7 pages).
Office Action issued in corresponding Chinese Patent Application No. 202080089604.1 dated Jun. 17, 2024 (10 pages).
International Searching Authority, "International Search Report," issued in connection with International Patent Application No. PCT/JP2020/048160, dated Mar. 16, 2021.
Office Action issued in related Japanese Patent Application No. 2019-236576, dated Jun. 6, 2023.

\* cited by examiner

CURABLE RESIN COMPOSITION AND DISPLAY DEVICE

CROSS-REFERENCE TO RELATED APPLICATIONS

The present application claims priority under 37 U.S.C. § 371 to International Patent Application No. PCT/JP2020/048160, filed Dec. 23, 2020, which claims priority to and the benefit of Japanese Patent Application No. 2019-236575, filed on Dec. 26, 2019. The contents of these applications are hereby incorporated by reference in their entireties.

TECHNICAL FIELD

The present invention relates to a curable resin composition, and further relates to a cured film thereof, and a display device including the cured film.

BACKGROUND ART

Patent Literature 1 discloses a curable resin composition containing quantum dots.

CITATION LIST

Patent Literature

Patent Literature 1: Japanese Patent Laid-Open No. 2016-065178

SUMMARY OF INVENTION

Technical Problem

In the case of forming a cured film using the curable resin composition disclosed in Patent Literature 1, when the thickness of the coating film of the curable resin composition is increased in order to increase the emission intensity, the developing time may be prolonged.

An object of the present invention is to provide a curable resin composition capable of obtaining a film having a high development speed and having a high emission intensity even in a thick film.

Solution to Problem

The present invention provides a curable resin composition, a cured film, a display device, and a method for producing the curable resin composition described below.

- [1] A curable resin composition comprising: quantum dots (A); a resin (B); a photopolymerizable compound (C); a photopolymerization initiator (D); an antioxidant (E); a leveling agent (F); and a solvent (G),
  wherein the resin (B) has a weight-average molecular weight in terms of polystyrene of less than 10000 and an acid value of 90 mg KOH/g or more and 150 mg KOH/g or less.
- [2] The curable resin composition according to [1], wherein the resin (B) comprises a resin having an acrylic equivalent of 300 g/eq or more and 2000 g/eq or less.
- [3] The curable resin composition according to [1] or [2], wherein a mass ratio of the resin (B) to the photopolymerizable compound (C) is 1 or more.
- [4] The curable resin composition according to any one of [1] to [3], wherein the photopolymerization initiator (D) comprises an oxime compound.
- [5] The curable resin composition according to any one of [1] to [4], wherein the antioxidant (E) comprises a phosphorus/phenol composite antioxidant.
- [6] The curable resin composition according to any one of [1] to [5], wherein the leveling agent (F) comprises a fluorine-based surfactant or a silicone-based surfactant.
- [7] The curable resin composition according to any one of [1] to [6], wherein the curable resin composition is free of an aliphatic tertiary amine compound and an aliphatic quaternary ammonium salt compound, or comprises at least one of an aliphatic tertiary amine compound and an aliphatic quaternary ammonium salt compound in an amount of less than 0.4% by mass based on a total amount of a solid content of the curable resin composition.
- [8] A cured film formed from the curable resin composition according to any one of [1] to [7].
- [9] A display device comprising the cured film according to [8].
- [10] A method for producing the curable resin composition according to [1], comprising:
  a step of preparing the resin (B),
  wherein the resin (B) is free of an aliphatic tertiary amine compound and an aliphatic quaternary ammonium salt compound, or contains at least one of an aliphatic tertiary amine compound and an aliphatic quaternary ammonium salt compound in an amount of less than 0.8% by mass based on a total amount of a solid content of the resin (B).
- [11] The production method according to [10], wherein an amine compound is not used as a reaction catalyst in the step of preparing the resin (B).

Advantageous Effects of Invention

According to the present invention, it is possible to provide a curable resin composition capable of obtaining a film having a high development speed and having a high emission intensity even in a thick film.

DESCRIPTION OF EMBODIMENTS

<Curable Resin Composition>

A curable resin composition according to the present invention contains quantum dots (A), a resin (B), a photopolymerizable compound (C), a photopolymerization initiator (D), an antioxidant (E), a leveling agent (F), and a solvent (G).

[1] Quantum Dots (A)

The quantum dots (A) are semiconductor fine particles having a particle size of 1 nm or more and 100 nm or less and absorb ultraviolet light or visible light and emit light by utilizing a band gap of the semiconductor.

Examples of the quantum dots (A) include compounds of Group 12 element and Group 16 element such as CdS, CdSe, CdTe, ZnS, ZnSe, ZnTe, HgS, HgSe, HgTe, CdHgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe; compounds of Group 13 element and Group 15 element such as GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAl- NAs, GaAlPAs, GaInNP, GaInNAs, GaInPAs, InAlNP, InAlNAs and InAlPAs; compounds of Group 14 element and Group 16 element such as PdS and PbSe.

When the quantum dots (A) contain S or Se, the quantum dots surface-modified with a metal oxide or an organic substance may be used. By using the surface-modified quantum dots, it is possible to prevent S or Se from being extracted by a reaction component in the material forming the organic layer.

Further, the quantum dots (A) may form a core-shell structure by combining the above compounds. Examples of such a combination include fine particles having a core of CdSe and a shell of ZnS.

Since the energy state of the quantum dots (A) depends on its size, the emission wavelength can be freely selected by changing the particle size. For example, in the case of quantum dots composed of only CdSe, the peak wavelengths of the fluorescence spectrum when the particle sizes are 2.3 nm, 3.0 nm, 3.8 nm, and 4.6 nm are 528 nm, 570 nm, 592 nm, and 637 nm, respectively. The light emitted from the quantum dots (A) has a narrow spectral width, and by combining light having such a steep peak, the displayable color gamut of the display device is expanded. Further, the quantum dots (A) have high responsiveness, and can efficiently utilize light emitted from a light source.

The curable resin composition of the present invention may contain only quantum dots that emit light having a specific wavelength in response to light emitted from a light source, or may contain two or more kinds of quantum dots that emit light having different wavelengths in combination. Examples of the light having a specific wavelength include red light, green light, and blue light.

The content ratio of the quantum dots (A) may be, for example, based on the total amount of the solid content of the curable resin composition, 0.1% by mass or more and 60% by mass or less, preferably 5% by mass or more and 50% by mass or less, and more preferably 20% by mass or more and 45% by mass or less. As used herein, the total amount of the solid content means the total of the curable resin composition components excluding the solvent (G) described later. The content ratio of the curable resin composition in the solid content can be measured by a known analytical means such as liquid chromatography or gas chromatography.

[2] Resin (B)

The resin (B) has a weight-average molecular weight in terms of polystyrene of less than 10000, and may be, for example, 9000 or less. Since the resin (B) has the above weight-average molecular weight in terms of polystyrene, there is a tendency that a film having a high development speed and a high emission intensity can be obtained even in a thick film. The weight-average molecular weight of the resin (B) in terms of polystyrene may be, for example, in the range of 1000 or more and 9000 or less, and is preferably in the range of 2000 or more and 8500 or less, and more preferably in the range of 3000 or more and 8500 or less, from the viewpoints of development speed and emission intensity. The weight-average molecular weight of the resin (B) in terms of polystyrene is measured according to the measurement method described in the section of Examples below. Since the resin (B) has a weight-average molecular weight in terms of polystyrene within the above range, there is a tendency that a film in which the amount of outgas released by heating is reduced can be easily obtained. Since the resin (B) has a weight-average molecular weight in terms of polystyrene within the above range, there is a tendency that a film exhibiting excellent solvent resistance can be easily obtained.

The acid value of the resin (B) is in the range of 90 mg KOH/g or more and 150 mg KOH/g or less based on the solid content. When the acid value is less than 90 mg KOH/g, the solubility in an alkali developer may be lowered and a residue may be left on the substrate, and when the acid value is more than 150 mg KOH/g, peeling of the cured pattern is more likely to occur. The acid value of the resin (B) is in the range of 95 mg KOH/g or more and 140 mg KOH/g or less, more preferably in the range of 100 mg KOH/g or more and 130 mg KOH/g or less, from the viewpoint of the developability. Here, the acid value is a value measured as the amount (mg) of potassium hydroxide necessary for neutralizing 1 g of the resin (D), and can be determined by titrating with, for example, an aqueous potassium hydroxide solution. The acid value of the resin (B) is measured according to the measurement method described in the section of Examples below. Since the resin (B) has an acid value within the above range, there is a tendency that a film exhibiting excellent solvent resistance can be easily obtained.

The molecular weight distribution [weight-average molecular weight (Mw)/number-average molecular weight (Mn)] of the resin (B) may be, for example, 1.0 or more and 6.0 or less, and preferably 1.2 or more and 4.0 or less from the viewpoint of developability.

Examples of the resin (B) include the following resins [K1] to [K4]:

resin [K1]: copolymer obtained by copolymerizing at least one (a) (hereinafter also referred to as "(a)") selected from the group consisting of an unsaturated carboxylic acid and an unsaturated carboxylic acid anhydride and a monomer (c) (hereinafter also referred to as "(c)") copolymerizable with (a) (but different from (a));

resin [K2]: resin obtained by reacting a copolymer of (a) and (c) with a monomer (b) (hereinafter also referred to as "(b)") having a cyclic ether structure having 2 to 4 carbon atoms and an ethylenically unsaturated bond;

resin [K3]: resin obtained by reacting a copolymer of (b) and (c) with (a); and resin [K4]: resin obtained by reacting a copolymer of (b) and (c) with (a) and further reacting with a carboxylic acid anhydride.

Specific examples of (a) include unsaturated monocarboxylic acids such as (meth)acrylic acid, crotonic acid, and o-, m-, and p-vinylbenzoic acid;

unsaturated dicarboxylic acids such as maleic acid, fumaric acid, citraconic acid, mesaconic acid, itaconic acid, 3-vinylphthalic acid, 4-vinylphthalic acid, 3,4,5,6-tetrahydrophthalic acid, 1,2,3,6-tetrahydrophthalic acid, dimethyltetrahydrophthalic acid, and 1,4-cyclohexenedicarboxylic acid;

bicyclo unsaturated compounds containing a carboxy group, such as methyl-5-norbornene-2,3-dicarboxylic acid, 5-carboxybicyclo[2.2.1]hept-2-ene, 5,6-dicarboxybicyclo[2.2.1]hept-2-ene, 5-carboxy-5-methylbicyclo[2.2.1]hept-2-ene, 5-carboxy-5-ethylbicyclo[2.2.1]hept-2-ene, 5-carboxy-6-methylbicyclo[2.2.1]hept-2-ene, and 5-carboxy-6-ethylbicyclo[2.2.1]hept-2-ene;

unsaturated dicarboxylic acid anhydrides such as maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, 5,6-dicarboxybicyclo[2.2.1]hept-2-ene anhydride;

unsaturated mono[(meth)acryloyloxyalkyl]esters of di- or higher polycarboxylic acids such as mono[2-(meth)acryloyloxyethyl]succinate and mono[2-(meth)acryloyoxyethyl]phthalate; and unsaturated acrylates containing a hydroxy group and a carboxy group in the same molecule, such as α-(hydroxymethyl) acrylic acid.

Of these, (meth) acrylic acid, maleic anhydride and the like are preferable from the viewpoint of copolymerization reactivity and solubility of the obtained resin in an alkaline aqueous solution.

Here, the term (meth)acrylic acid means acrylic acid and/or methacrylic acid. Hereinafter, the same applies to "(meth)acryloyl", "(meth)acrylate" and the like.

(b) is, for example, a monomer having a cyclic ether structure having 2 to 4 carbon atoms (for example, at least one selected from the group consisting of an oxirane ring, an oxetane ring, and a tetrahydrofuran ring) and an ethylenically unsaturated bond. (b) is preferably a monomer having a cyclic ether structure having 2 to 4 carbon atoms and a (meth)acryloyloxy group.

Examples of (b) include monomers having an oxirane ring and an ethylenically unsaturated bond, such as glycidyl (meth)acrylate, β-methylglycidyl (meth)acrylate, β-ethylglycidyl (meth)acrylate, glycidyl vinyl ether, o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether, α-methyl-p-vinylbenzyl glycidyl ether, 2,3-bis(glycidyloxymethyl)styrene, 2,4-bis(glycidyloxymethyl)styrene, 2,5-bis(glycidyloxymethyl) styrene, 2,6-bis(glycidyloxymethyl)styrene, 2,3,4-tris(glycidyloxymethyl) styrene, 2,3,5-tris(glycidyloxymethyl) styrene, 2,3,6-tris(glycidyloxymethyl) styrene, 3,4,5-tris(glycidyloxymethyl)styrene, and 2,4,6-tris(glycidyloxymethyl) styrene;

monomers having an oxetane ring and an ethylenically unsaturated bond, such as 3-methyl-3-methacryloyloxymethyloxetane, 3-methyl-3-acryloyloxymethyloxetane, 3-ethyl-3-methacryloyloxymethyloxetane, 3-ethyl-3-acryloyloxymethyloxetane, 3-methyl-3-methacryloyloxyethyloxetane, 3-methyl-3-acryloyloxyethyloxetane, 3-ethyl-3-methacryloyloxyethyloxetane, and 3-ethyl-3-acryloyloxyethyloxetane; and monomers having a tetrahydrofuran ring and an ethylenically unsaturated bond, such as tetrahydrofurfuryl acrylate (for example, Viscoat V #150, manufactured by OSAKA ORGANIC CHEMICAL INDUSTRY LTD.) and tetrahydrofurfuryl methacrylate.

(b) is preferably a monomer having an oxirane ring and an ethylenically unsaturated bond, because the reactivity during the production of the resins [K2] to [K4] is high and unreacted (b) hardly remains.

Examples of (c) include (meth)acrylic esters such as methyl (meth)acrylate, ethyl (meth)acrylate, n-butyl (meth)acrylate, sec-butyl (meth)acrylate, tert-butyl (meth)acrylate, 2-ethylhexyl (meth)acrylate, dodecyl (meth)acrylate, lauryl (meth)acrylate, stearyl (meth)acrylate, cyclopentyl (meth)acrylate, cyclohexyl (meth)acrylate, 2-methylcyclohexyl (meth)acrylate, tricyclo[5.2.1.0$^{2,6}$]decan-8-yl (meth)acrylate (referred to as "dicyclopentanyl (meth)acrylate" (common name) in the art or sometimes referred to as "tricyclodecyl (meth)acrylate"), tricyclo[5.2.1.0$^{2,6}$]decen-8-yl (meth) acrylate (which is referred to as "dicyclopentenyl (meth) acrylate" (common name) in the art), dicyclopentanyloxyethyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, and benzyl (meth)acrylate;

hydroxy group-containing (meth)acrylic esters such as 2-hydroxyethyl (meth)acrylate and 2-hydroxypropyl (meth)acrylate;

dicarboxylic diesters such as diethyl maleate, diethyl fumarate, and diethyl itaconate;

bicyclo unsaturated compounds such as bicyclo[2.2.1]hept-2-ene, 5-methylbicyclo[2.2.1]hept-2-ene, 5-ethylbicyclo[2.2.1]hept-2-ene, 5-hydroxybicyclo[2.2.1]hept-2-ene, 5-hydroxymethylbicyclo[2.2.1]hept-2-ene, 5-(2'-hydroxyethyl)bicyclo[2.2.1]hept-2-ene, 5-methoxybicyclo[2.2.1]hept-2-ene, 5-ethoxybicyclo[2.2.1]hept-2-ene, 5,6-dihydroxybicyclo[2.2.1]hept-2-ene, 5,6-di(hydroxymethyl)bicyclo[2.2.1]hept-2-ene, 5,6-di(2'-hydroxyethyl)bicyclo[2.2.1]hept-2-ene, 5,6-dimethoxybicyclo[2.2.1]hept-2-ene, 5,6-diethoxybicyclo[2.2.1]hept-2-ene, 5-hydroxy-5-methylbicyclo[2.2.1]hept-2-ene, 5-hydroxy-5-ethylbicyclo[2.2.1]hept-2-ene, 5-hydroxymethyl-5-methylbicyclo[2.2.1]hept-2-ene, 5-tert-butoxycarbonylbicyclo[2.2.1]hept-2-ene, 5-cyclohexyloxycarbonylbicyclo[2.2.1]hept-2-ene, 5-phenoxycarbonylbicyclo[2.2.1]hept-2-ene, 5,6-bis(tert-butoxycarbonyl)bicyclo[2.2.1]hept-2-ene, and 5,6-bis(cyclohexyloxycarbonyl)bicyclo[2.2.1]hept-2-ene;

dicarbonylimide derivatives such as N-phenylmaleimide, N-cyclohexylmaleimide, N-benzylmaleimide, N-succinimidyl-3-maleimidobenzoate, N-succinimidyl-4-maleimidobutyrate, N-succinimidyl-6-maleimide caproate, N-succinimidyl-3-maleimide propionate, and N-(9-acridinyl)maleimide; and styrene, α-methylstyrene, m-methylstyrene, p-methylstyrene, vinyltoluene, p-methoxystyrene, acrylonitrile, methacrylonitrile, vinyl chloride, vinylidene chloride, acrylamide, methacrylamide, vinyl acetate, 1,3-butadiene, isoprene, and 2,3-dimethyl-1,3-butadiene.

Among these, from the viewpoint of copolymerization reactivity and heat resistance, styrene, vinyltoluene, N-phenylmaleimide, N-cyclohexylmaleimide, N-benzylmaleimide, bicyclo[2.2.1]hept-2-ene and the like are preferable.

In the resin [K1], the ratio of the structural unit derived from each of (a) and (c) in the total structural units constituting the resin [K1] is preferably the following:

the structural unit derived from (a): 2 mol % or more and 60 mol % or less; and the structural unit derived from (c): 40 mol % or more and 98 mol % or less, and more preferably the following:

the structural unit derived from (a): 10 mol % or more and 50 mol % or less; and the structural unit derived from (c): 50 mol % or more and 90 mol % or less.

When the ratio of the structural units of the resin [K1] is within the above range, the curable composition tends to be excellent in storage stability, developability when forming a cured pattern, and solvent resistance of the obtained cured pattern.

The resin [K1] can be produced with reference to the method disclosed in for example, a document "Experimental Method for Polymer Synthesis" (edited by Takayuki Otsu, published by Kagaku-Dojin Publishing Company, INC, First Edition, First Printed on Mar. 1, 1972) and cited documents described in the above-mentioned document.

Specific examples thereof include the following method: predetermined amounts of (a) and (c), a polymerization initiator, a solvent and the like are placed in a reaction vessel; for example, a deoxidization atmosphere is formed by replacing oxygen with nitrogen; and these are heated or kept warm during stirring. The polymerization initiator, the solvent and the like used here are not particularly limited, and those commonly used in the art can be used. Examples of the polymerization initiator include azo compounds (2,2'-azobisisobutyronitrile, 2,2'-azobis(2,4-dimethylvaleronitrile) and the like) and organic peroxides (benzoyl peroxide and the like), and the solvent may be a solvent capable of dissolving each monomer, and examples of the solvent (H) that may be contained in the curable composition of the present invention include solvents to be described later.

A solution after a reaction, of the resultant copolymer may be used as it is; a concentrated or diluted solution of the copolymer may be used; or a solid (powder) taken out from the copolymer by a method such as reprecipitation may be used. In particular, by using the solvent (G) described later as the solvent for this polymerization, the solution after the reaction can be used as it is for the preparation of the curable composition of the present invention, whereby the producing process of the curable composition of the present invention can be simplified.

The resin [K2] can be produced by obtaining a copolymer of (a) and (c) and adding a cyclic ether having 2 to 4 carbon atoms of (b) to a carboxylic acid and/or a carboxylic acid anhydride of (a).

The copolymer of (a) and (c) is first produced in the same manner as in the method described as the method for producing the resin [K1]. In this case, the ratio of the structural units derived from each is preferably the same ratio as that described in the resin [K1].

Next, a cyclic ether having 2 to 4 carbon atoms of (b) is reacted with a part of the carboxylic acid and/or the carboxylic acid anhydride derived from (a) in the copolymer.

Subsequent to the production of the copolymer of (a) and (c), the resin [K2] can be produced by replacing a nitrogen atmosphere in a flask with air, and reacting (b) in the presence of a reaction catalyst for a carboxylic acid or a carboxylic acid anhydride and a cyclic ether (for example, an organic phosphorus compound, a metallic complex, or an amine compound), and a polymerization inhibitor (for example, hydroquinone and the like), for example, at 60° C. or more and 130° C. or less for 1 to 10 hours.

The amount of (b) used is preferably 5 mol or more and 80 mol or less, and more preferably 10 mol or more and 75 mol or less, based on 100 mol of (a). Within this range, the storage stability of the curable composition, the developability when forming the cured pattern, and the solvent resistance, heat resistance, mechanical strength and sensitivity of the cured pattern tend to be well balanced.

Examples of the organic phosphorus compound as a reaction catalyst include triphenylphosphine. As the amine compound as the reaction catalyst, for example, an aliphatic tertiary amine compound or an aliphatic quaternary ammonium salt compound can be used, and specific examples thereof include tris(dimethylaminomethyl)phenol, triethylamine, tetrabutylammonium bromide, and tetrabutylammonium chloride. From the viewpoint of developability and emission intensity, the reaction catalyst is preferably an organic phosphorus compound.

The amount of the reaction catalyst used is preferably 0.001 part by mass or more and 5 parts by mass or less based on 100 parts by mass of the total amount of (a), (b), and (c). The amount of the polymerization inhibitor used is preferably 0.001 part by mass or more and 5 parts by mass or less based on 100 parts by mass of the total amount of (a), (b), and (c).

The reaction conditions such as the charging method, the reaction temperature and the time can be appropriately adjusted in consideration of the production equipment, the amount of heat generated by the polymerization, and the like. In the same manner as the polymerization conditions, the charging method and the reaction temperature can be appropriately adjusted in consideration of the production equipment, the amount of heat generated by the polymerization, and the like.

The resin [K3] is produced by producing a copolymer of (b) and (c) in the same manner as in the above-mentioned method for producing the resin [K1] as a first step. In the same manner as in the above, a solution after a reaction, of the resultant copolymer may be used as it is; a concentrated or diluted solution of the copolymer may be used; or a solid (powder) taken out from the copolymer by a method such as reprecipitation may be used.

The ratio of the structural unit derived from each of (b) and (c) based on the total number of moles of the total structural units constituting the copolymer is preferably the following:
  the structural unit derived from (b): 5 mol % or more and 95 mol % or less; and
  the structural unit derived from (c): 5 mol % or more and 95 mol % or less, and more preferably the following:
  the structural unit derived from (b): 10 mol % or more and 90 mol % or less; and
  the structural unit derived from (c): 10 mol % or more and 90 mol % or less.

Further, under the same conditions as the method for producing the resin [K2], the resin [K3] can be obtained by reacting a carboxylic acid or carboxylic acid anhydride of (a) to the cyclic ether derived from (b) contained in the copolymer of (b) and (c).

The amount of (a) used which is reacted with the copolymer is preferably 5 mol or more and 80 mol or less based on 100 mol of (b).

The resin [K4] is a resin obtained by further reacting the resin [K3] with a carboxylic acid anhydride. A carboxylic acid anhydride is reacted with a hydroxy group generated by a reaction between a cyclic ether and a carboxylic acid or a carboxylic anhydride.

Examples of the carboxylic acid anhydride include maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, 5,6-dicarboxybicyclo[2.2.1]hept-2-ene anhydride. The amount of the carboxylic acid anhydride used is preferably 0.5 to 1 mol based on 1 mol of the amount used in (a).

Specific examples of the resin (K1), the resin (K2), the resin (K3), and the resin (K4) include a resin [K1] such as a benzyl (meth)acrylate/(meth)acrylic acid copolymer and a styrene/(meth)acrylic acid copolymer;
  a resin [K2] such as a resin produced by adding glycidyl (meth)acrylate to a benzyl (meth)acrylate/(meth)acrylic acid copolymer, a resin produced by adding glycidyl (meth)acrylate to a tricyclodecyl (meth)acrylate/styrene/(meth)acrylic acid copolymer, or a resin produced by adding glycidyl (meth)acrylate to a tricyclodecyl (meth)acrylate/benzyl (meth)acrylate/(meth)acrylic acid copolymer; a resin [K3] such as a resin produced by reacting a tricyclodecyl (meth)acrylate/glycidyl (meth)acrylate copolymer with (meth)acrylic acid or a resin produced by reacting a tricyclodecyl (meth)acrylate/styrene/glycidyl (meth)acrylate copolymer with (meth)acrylic acid; and a resin [K4] such as a resin produced by reacting a tricyclodecyl (meth)acrylate/glycidyl (meth)acrylate copolymer with (meth)acrylic acid to produce a resin and then reacting this resin with tetrahydrophthalic anhydride.

In particular, the resin (B) preferably contains at least one selected from the group consisting of the resin [K2], the resin [K3], and the resin [K4].

As a further example of the resin (B), the alkali-soluble resin disclosed in Japanese Patent Laid-Open No. 2018-123274 can be mentioned. Specific examples thereof include a polymer (hereinafter, also referred to as resin (Ba)) which has a double bond in a side chain, includes a structural unit (α) represented by the following general formula (I) and a structural unit (β) represented by the following general formula (II) in a main chain, and further includes an acid group. The acid group may be introduced into the resin when, for example, the resin (Ba) contains a structural unit (γ) derived from an acid group-containing monomer (for example, (meth)acrylic acid). The resin (Ba) preferably contains the structural units (α), (β), and (γ) in the main chain skeleton.

[Formula 1]

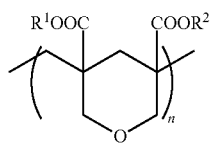

(I)

[In the formula, $R^1$ and $R^2$ are the same or different and each represent a hydrogen atom or a hydrocarbon group having 1 to 25 carbon atoms. n represents the average number of repeating units of the structural units represented by the general formula (I), and is a number of 1 or more.]

[Formula 2]

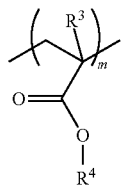

(II)

[In the formula, each $R^3$ is the same or different and represents a hydrogen atom or a methyl group. Each $R^4$ is the same or different and represents a linear or branched chain hydrocarbon group having 4 to 20 carbon atoms. m represents the average number of repeating units of the structural units represented by the general formula (II), and is a number of 1 or more.]

The content proportion of the structural unit (α) in the resin (Ba) may be, for example, from the viewpoint of heat resistance and storage stability, 0.5% by mass or more and 50% by mass or less, preferably 1% by mass or more and 40% by mass or less, and more preferably 5% by mass or more and 30% by mass or less based on 100% by mass of the total amount of all monomer units that give the main chain skeleton of the resin (Ba). In the general formula (I), n represents the average number of repeating units of the structural units (α) in the resin (Ba), and n can be set so that the content proportion of the structural units (α) falls within the above range.

The content proportion of the structural unit (β) may be, for example, from the viewpoint of the solvent resistance, 10% by mass or more and 90% by mass or less, preferably 20% by mass or more and 80% by mass or less, and more preferably 30% by mass or more and 75% by mass or less based on 100% by mass of the total amount of all monomer units that give the main chain skeleton of the resin (Ba). In the general formula (II), m represents the average number of repeating units of the structural units (β) in the resin (Ba), and m can be set so that the content proportion of the structural units (β) falls within the above range.

The content proportion of the structural unit (γ) may be, for example, from the viewpoint of the solubility in the alkaline substance and the solubility in the solvent, 0.5% by mass or more and 50% by mass or less, preferably 2% by mass or more and 50% by mass or less, and more preferably 5% by mass or more and 45% by mass or less based on 100% by mass of the total amount of all monomer units that give the main chain skeleton of the resin (Ba).

The resin (B) may include one or more selected from the group consisting of the resin [K1], resin [K2], resin [K3], resin [K4], and resin (Ba) described above.

The weight-average molecular weight of the resin (B) can be adjusted within the range of 9000 or less by appropriately combining the selection of raw materials to be used, a charging method, and reaction conditions such as reaction temperature and time.

The resin (B) may contain a resin having an acrylic equivalent of, for example, 300 g/eq or more and 2000 g/eq or less (hereinafter, also referred to as an acrylic resin). The acrylic resin preferably has an acrylic equivalent of 500 g/eq or more and 1500 g/eq or less. When the resin (B) contains an acrylic resin, development which is quenched during the color filter process tends to be easily prevented. On the other hand, when the resin (B) contains a resin having an acrylic equivalent of more than 2000 g/eq, the ability to effectively protect the quantum dots tends to be difficult to obtain, and when the resin contains a resin having an acrylic equivalent of less than the above range, the resin tends to be easily peeled off without being dissolved during development. Preferably, the resin (B) is an acrylic resin. Since the resin (B) has an acrylic equivalent within the above range, there is a tendency that a film in which the amount of outgas released by heating is reduced can be easily obtained. Since the resin (B) has an acrylic equivalent within the above range, there is a tendency that a film exhibiting excellent solvent resistance can be easily obtained.

The content ratio of the resin (B) in the curable resin composition may be, for example, based on the total amount of the solid content of the curable resin composition, 5% by mass or more and 80% by mass or less, preferably 10% by mass or more and 70% by mass or less, more preferably 13% by mass or more and 60% by mass or less, and still more preferably 17% by mass or more and 55% by mass or less. When the content ratio of the resin (B) is within the above range, the quantum dots tend to be easily dispersed and the emission efficiency tends to be easily maintained at a high level during the step.

The resin (B) is preferably free of an aliphatic tertiary amine compound and an aliphatic quaternary ammonium salt compound, or contains at least one of an aliphatic tertiary amine compound and an aliphatic quaternary ammonium salt compound in an amount of less than 0.4% by mass based on the total amount of the solid content of the curable resin composition from the viewpoint of developability and emission intensity. Further, the curable resin composition is preferably free of an aliphatic tertiary amine compound and an aliphatic quaternary ammonium salt compound, or contains at least one of an aliphatic tertiary amine compound and an aliphatic quaternary ammonium salt compound in an amount of less than 0.4% by mass based on the total amount of the solid content of the curable resin composition from the viewpoint of developability and emission intensity. In the production process of the resin (B), an amine compound is preferably not used as a reaction catalyst from the viewpoint of developability and emission intensity. The contents of the aliphatic tertiary amine compound and the aliphatic quaternary ammonium salt compound can be measured according to the measurement method in the section of Examples below. In the curable resin composition, the contents of the aliphatic tertiary amine compound and the aliphatic quaternary ammonium salt compound may be, for example, less than 0.4% by mass based on the total amount of the solid content of the curable resin composition.

In the curable resin composition, the mass ratio (solid content ratio) of the resin (B) to the photopolymerizable compound (C) described later may be, for example, 1 or more, and is preferably 1.5 or more, more preferably 2 or more, and still more preferably 2.5 or more from the viewpoint of developability and emission intensity.

[3] Photopolymerizable Compound (C)

The photopolymerizable compound (C) is a compound that can be polymerized by an active radical, an acid, or the like generated from the photopolymerization initiator (D) described later, and examples thereof include a compound having an ethylenically unsaturated bond, and a (meth) acrylic ester compound is preferable.

As used herein, the term "(meth)acrylic acid" represents at least one selected from the group consisting of acrylic acid and methacrylic acid. Notations such as "(meth)acryloyl" and "(meth)acrylate" have the same meaning.

In particular, the photopolymerizable compound (C) is preferably a polymerizable compound having three or more ethylenically unsaturated bonds. Examples of such a polymerizable compound include trimethylolpropane tri(meth) acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa (meth)acrylate, tripentaerythritol hepta(meth)acrylate, tetrapentaerythritol deca(meth)acrylate, tetrapentaerythritol nona (meth)acrylate, tris(2-(meth)acryloyloxyethyl)isocyanurate, ethylene glycol-modified pentaerythritol tetra(meth)acrylate, ethylene glycol-modified dipentaerythritol hexa(meth) acrylate, propylene glycol-modified pentaerythritol tetra(meth)acrylate, propylene glycol-modified dipentaerythritol hexa(meth)acrylate, caprolactone-modified pentaerythritol tetra(meth)acrylate, and caprolactone-modified dipentaerythritol hexa(meth)acrylate.

The weight-average molecular weight of the photopolymerizable compound (C) is preferably 150 or more and 2900 or less, and more preferably 250 or more and 1500 or less.

The content ratio of the photopolymerizable compound (C) in the curable resin composition is preferably, for example, based on the total amount of the solid content of the curable resin composition, 7% by mass or more and 60% by mass or less, more preferably 10% by mass or more and 45% by mass or less, and still more preferably 13% by mass or more and 30% by mass or less. When the content ratio of the photopolymerizable compound (C) is within the above range, the residual film ratio of the cured pattern and the chemical resistance of the cured pattern tend to be further improved.

[4] Photopolymerization Initiator (D)

The photopolymerization initiator (D) is a compound capable of initiating a polymerization by generating an active radical, an acid, or the like by the action of light or heat, and can contain at least one selected from the group consisting of an oxime compound, a biimidazole compound, a triazine compound, and an acylphosphine compound. Above all, it is preferable to contain at least one of an oxime compound and an acylphosphine compound. When these polymerization initiators are used, the residual film ratio of the cured pattern is increased. When the above photopolymerization initiator is used, there is a tendency that a film in which the amount of outgas released by heating is reduced can be easily obtained. Further, when the photopolymerization initiator is used, there is a tendency that a film exhibiting excellent solvent resistance can be easily obtained.

The oxime compound, the biimidazole compound, the triazine compound, and the acylphosphine compound tend to have higher polymerization sensitivity during the production of the cured film, and thus are preferably compounds having at least two aromatic rings in the molecule.

Examples of the aromatic ring include 5-membered rings such as a furan ring, a pyrrole ring, an imidazole ring, a thiophene ring, and a thiazole ring; 6-membered rings such as a benzene ring, a pyridine ring, a pyrimidine ring, and a triazine ring; and condensed rings thereof.

The oxime compound is preferably an O-acyloxime compound, and is a compound having a partial structure represented by the formula (d1). Hereinafter, * represents a bond.

[Formula 3]

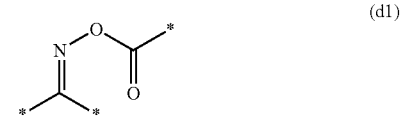

Examples of the oxime compound include N-benzoyloxy-1-(4-phenylsulfanylphenyl)butan-1-one-2-imine, N-benzoyloxy-1-(4-phenylsulfanylphenyl)octan-1-one-2-imine, N-benzoyloxy-1-(4-phenylsulfanylphenyl)-3-cyclopentylpropan-1-one-2-imine, N-acetoxy-1-[9-ethyl-6-(2-methylbenzoyl)-9H-carbazole-3-yl]ethane-1-imine, N-acetoxy-1-[9-ethyl-6-{2-methyl-4-(3,3-dimethyl-2,4-dioxacyclopentanylmethyloxy)benzoyl}-9H-carbazole-3-yl]ethane-1-imine, N-acetoxy-1-[9-ethyl-6-(2-methylbenzoyl)-9H-carbazole-3-yl]-3-cyclopentylpropane-1-imine, and N-benzoyloxy-1-[9-ethyl-6-(2-methylbenzoyl)-9H-carbazole-3-yl]-3-cyclopentylpropan-1-one-2-imine, and compounds disclosed in Japanese Patent Laid-Open No. 2011-132215, International Publication No. 2008/78678, International Publication No. 2008/78686, and International Publication No. 2012/132558. Commercially available products such as Irgacure OXE01 and Irgacure OXE02 (all manufactured by BASF Japan Ltd.), and N-1919 (manufactured by ADEKA Corporation) may also be used.

Of these, the oxime compound is preferably at least one selected from the group consisting of N-benzoyloxy-1-(4-phenylsulfanylphenyl)butan-1-one-2-imine, N-benzoyloxy-1-(4-phenylsulfanylphenyl)octan-1-one-2-imine, and N-benzoyloxy-1-(4-phenylsulfanylphenyl)-3-cyclopentylpropan-1-one-2-imine, and more preferably N-benzoyloxy-1-(4-phenylsulfanylphenyl)octan-1-one-2-imine.

An example of the biimidazole compound is a compound represented by the formula (d5):

[Formula 4]

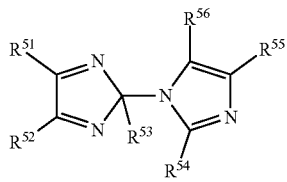

[In the formula (d5), $R^{51}$ to $R^{56}$ represent an aryl group having 6 to 10 carbon atoms which may have a substituent.]

Examples of the aryl group having 6 to 10 carbon atoms include a phenyl group, a toluyl group, a xylyl group, an ethylphenyl group, and a naphthyl group, and preferable is a phenyl group.

Examples of the substituent include a halogen atom and an alkoxy group having 1 to 4 carbon atoms. Examples of the halogen atom include a fluorine atom, a chlorine atom, a bromine atom and an iodine atom, and preferable is a chlorine atom. Examples of the alkoxy group having 1 to 4 carbon atoms include a methoxy group, an ethoxy group, a propoxy group, and a butoxy group, and preferable is a methoxy group.

Examples of the biimidazole compound include 2,2'-bis(2-chlorophenyl)-4,4',5,5'-tetraphenylbiimidazole, 2,2'-bis(2,3-dichlorophenyl)-4,4',5,5'-tetraphenylbiimidazole (for example, see Japanese Patent Laid-Open No. 06-75372 and Japanese Patent Laid-Open No. 06-75373), 2,2'-bis(2-chlorophenyl)-4,4',5,5'-tetraphenyl biimidazole, 2,2'-bis(2-chlorophenyl)-4,4',5,5'-tetra(alkoxyphenyl)biimidazole, 2,2'-bis(2-chlorophenyl)-4,4',5,5'-tetra(dialkoxyphenyl)biimidazole, 2,2'-bis(2-chlorophenyl)-4,4',5,5'-tetra(trialkoxyphenyl)biimidazole (for example, see Japanese Patent No. 48-38403 and Japanese Patent Laid-Open No. 62-174204), and an imidazole compound in which phenyl groups at the 4,4',5,5' positions are each substituted with a carboalkoxy group (for example, see Japanese Patent Laid-Open No. 7-10913). Of these, a compound represented by the following formula or a mixture thereof is preferable.

[Formula 5]

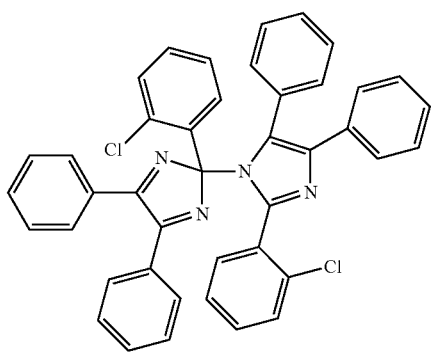

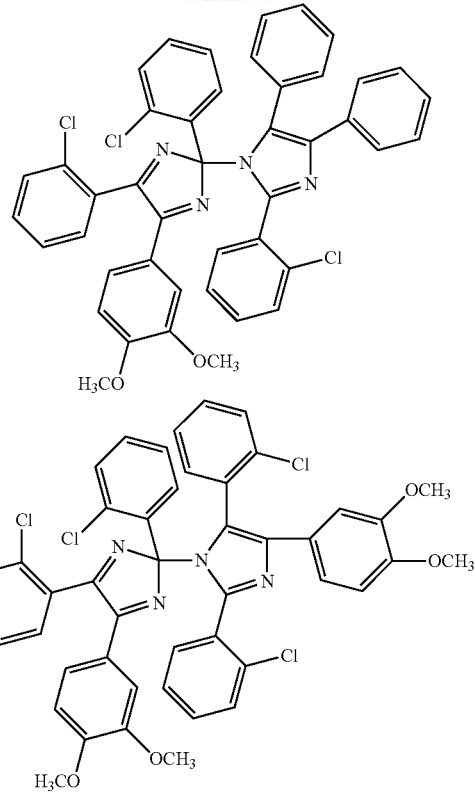

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine. Of these, 2,4-bis(trichloromethyl)-6-piperonyl-1,3,5-triazine is preferable.

Examples of the acylphosphine compound include bis(2,4,6-trimethylbenzoyl)phenylphosphine oxide and (2,4,6-trimethylbenzoyl)diphenylphosphine oxide.

The photopolymerization initiator described above may be used alone or in combination of two or more photopolymerization initiators. When two or more photopolymerization initiators are used in combination, a known polymerization initiator other than the oxime compound, biimidazole compound, triazine compound, and acylphosphine compound described above may be used in combination.

Examples of the known photopolymerization initiator include benzoin compounds such as benzoin, benzoin methyl ether, benzoin ethyl ether, benzoin isopropyl ether, and benzoin isobutyl ether; benzophenone compounds such as benzophenone, methyl o-benzoylbenzoate, 4-phenylbenzophenonne, 4-benzoyl-4'-methyldiphenyl sulfide, 3,3',4,4'-tetra(tert-butylperoxycarbonyl)benzophenone, 2,4,6-trimethylbenzophenone, and 4,4'-bis(diethylamino)benzophenone; quinone compounds such as 9,10-phenanthrene quinone, 2-ethylanthraquinone, and camphorquinone; and 10-butyl-2-chloroacridone, benzyl, methyl phenylglyoxylate, and a titanocene compound.

Further, examples of the other photopolymerization initiators include amines such as 2,4,6-trimethylbenzoyldiphenylphosphine oxide (Speedcure TPO, manufactured by Lambson), 2,4,6-trimethylbenzoylphenylethoxyphosphine oxide, bis(2,4,6-trimethylbenzoyl)-phenylphosphine oxide (Omnirad 819, manufactured by IGM Resins B.V.), bis(2,6-dimethoxybenzoyl)-2,4,4-trimethyl-pentylphosphine oxide, 2-hydroxy-2-methyl-[4-(1-methylvinyl)phenyl]propanol oligomer (ESACURE ONE; Lamberti S.p.A.), 2,2-dimethoxy-2-phenylacetophenone (Omnirad 651; manufactured by IGM Resins B.V.), 2-methyl-1-[4-(methylthio)phenyl]-2-morpholinopropan-1-one (Omnirad 907, manufactured by IGM Resins B.V.), 2-benzyl-2-dimethylamino-1-(4-morpholinophenyl)-butan-1-one (Omnirad 369, manufactured by IGM Resins B.V.), 2-chlorothioxanthone, 2,4-dimethylthioxanthone, 2,4-diisopropylthioxanthone, isopropylthioxanthone, 2-dimethylaminoethyl benzoate, dimethylaminoacetophenone, ethyl p-dimethylaminobenzoate, or isoamyl p-dimethylaminobenzoate. Among the other polymerization initiators, preferred is 2-methyl-1-[4-(methylthio)phenyl]-2-morpholinopropan-1-one (Omnirad 907, manufactured by IGM Resins B.V.).

Example of the combination of two or more photopolymerization initiators include a combination of an oxime compound and a biimidazole compound, an oxime compound and a triazine compound, an oxime compound and an acylphosphine compound, a biimidazole compound and a triazine compound, a combination of a biimidazole compound and an acylphosphine compound, and a combination of a triazine compound and an acylphosphine compound.

[Photopolymerization Initiation Aid (D1)]

Further, if necessary, a photopolymerization initiation aid (D1) may be used in combination. The photopolymerization initiation aid (D1) is a compound or a sensitizer used to promote the polymerization of the photopolymerizable compound in which polymerization has been initiated by the photopolymerization initiator, and when the photopolymerization initiation aid (D1) is contained, it is usually used in combination with the photopolymerization initiator. Examples of the photopolymerization initiation aid (D1) include amine compounds, alkoxyanthracene compounds, thioxanthone compounds, and carboxylic acid compounds.

Examples of the amine compound include triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylparatoluidine, 4,4'-bis(dimethylamino) benzophenone (common name: Michler's ketone), 4,4'-bis(diethylamino)benzophenone, and 4,4'-bis(ethylmethylamino)benzophenone, and of these, 4,4'-bis(diethylamino)benzophenone is preferable. Commercially available products such as EAB-F (manufactured by Hodogaya Chemical Co., Ltd.), may be used.

Examples of the alkoxy anthracene compound include 9,10-dimethoxyanthracene, 2-ethyl-9,10-dimethoxyanthracene, 9,10-diethoxyanthracene, 2-ethyl-9,10-diethoxyanthracene, 9,10-dibutoxyanthracene, and 2-ethyl-9,10-dibutoxyanthracene.

Examples of the thioxanthone compound include 2-isopropylthioxanthone, 4-isopropylthioxanthone, 2,4-diethylthioxanthone, 2,4-dichlorothioxanthone, and 1-chloro-4-propoxythioxanthone.

Examples of the carboxylic acid compound include phenylsulfanylacetic acid, methylphenylsulfanylacetic acid, ethylphenylsulfanylacetic acid, methylethylphenylsulfanylacetic acid, dimethylphenylsulfanylacetic acid, methoxyphenysulfanylacetic acid, dimethoxyphenylsulfanylacetic acid, chlorophenylsulfanylacetic acid, dichlorophenylsulfanylacetic acid, N-phenylglycine, phenoxyacetic acid, naphthylthioacetic acid, N-naphthylglycine, and naphthoxyacetic acid.

The content ratio of the photopolymerization initiator (D) is preferably 0.1 parts by mass or more and 300 parts by mass or less, and more preferably 0.1 parts by mass or more and 200 parts by mass or less, based on 100 parts by mass of the photopolymerizable compound (C). The content ratio of the photopolymerization initiator (D) is preferably 0.1 parts by mass or more and 30 parts by mass or less, and more preferably 1 part by mass or more and 20 parts by mass or less, based on 100 parts by mass of the total amount of the resin (D) and the photopolymerizable compound (C). When the content ratio of the photopolymerization initiator (D) is within the above range, the sensitivity tends to be increased and the exposure time tends to be shortened, so that the productivity of the cured film is improved.

Further, when the curable resin composition contains a photopolymerization initiation aid (D1), the content ratio of the photopolymerization initiation aid (D1) is preferably 0.1 parts by mass or more and 300 parts by mass or less, and more preferably 0.1 parts by mass or more and 200 parts by mass or less, based on 100 parts by mass of the photopolymerizable compound (C). The content ratio of the photopolymerization initiator (D) is preferably 0.1 parts by mass or more and 30 parts by mass or less, and more preferably 1 part by mass or more and 20 parts by mass or less, based on 100 parts by mass of the total amount of the resin (D) and the photopolymerizable compound (C). When the amount of the photopolymerization initiation aid (D1) is within this range, a cured film tends to be formed with higher sensitivity.

[5] Antioxidant (E)

The antioxidant (E) is not particularly limited as long as it is an antioxidant that is generally used industrially, and a phenol-based antioxidant, a phosphorus-based antioxidant, a phosphorus/phenol composite antioxidant, a sulfur-based antioxidant, and the like can be used. Two or more kinds of the antioxidants (E) may be used in combination. The phosphorus/phenol composite antioxidant may be a compound having one or more phosphorus atoms and one or more phenol structures in its molecule. Of these, a phosphorus/phenol composite antioxidant is preferable from the viewpoint of developability and emission intensity. When the phosphorus/phenol composite antioxidant is used, there is a tendency that a film in which the amount of outgas released by heating is reduced can be easily obtained. Further, when the phosphorus/phenol composite antioxidant is used, there is a tendency that a film exhibiting excellent solvent resistance can be easily obtained.

Examples of the phenol-based antioxidant include Irganox® 1010 (Irganox 1010: pentaerythritol tetrakis[3-(3,5-di-t-butyl-4-hydroxyphenyl)propionate], manufactured by BASF Japan Ltd.), Irganox 1076 (Irganox 1076: Octadecyl-3-(3,5-di-t-butyl-4-hydroxyphenyl)propionate, manufactured by BASF Japan Ltd.), Irganox 1330 (Irganox 1330: 3,3',3",5,5',5"-hexa-t-butyl-a,a',a"-(mesitylene-2,4,6-triyl) tri-p-cresol, BASF Japan Ltd.), Irganox 3114 (Irganox 3114: 1,3,5-tris(3,5-di-t-butyl-4-hydroxybenzyl)-1,3,5-triazine-2,4,6(1H,3H,5H)-trione, BASF Japan Ltd.), Irganox 3790 (Irganox 3790: 1,3,5-tris((4-t-butyl-3-hydroxy-2,6-xylyl) methyl)-1,3,5-triazine-2,4,6(1H,3H,5H)-trione, BASF Japan Ltd.), Irganox 1035 (Irganox 1035: thiodiethylenebis

[3-(3,5-di-tert-butyl-4 hydroxyphenyl)propionate], manufactured by BASF Japan Ltd.), Irganox 1135 (Irganox 1135: benzene propanoic acid, 3,5-bis(1,1-dimethylethyl)-4-hydroxy, C7-C9 side-chain alkyl ester, manufactured by BASF Japan Ltd.), Irganox 1520 L (Irganox 1520 L: 4,6-bis (octylthiomethyl)-o-cresol, manufactured by BASF Japan Ltd.), Irganox 3125 (Irganox 3125, BASF Japan Ltd.), Irganox 565 (Irganox 565: 2,4-bis(n-octylthio)-6-(4-hydroxy-3',5'-di-t-butylanilino)-1,3,5-triazine, manufactured by BASF Japan Ltd.), ADK STAB® AO-80 (ADK STAB AO-80: 3,9-bis(2-(3-(3-t-butyl-4-hydroxy-5-methylphenyl) propionyloxy)-1,1-dimethylethyl)-2,4,8,10-tetraoxaspiro(5, 5)undecane, manufactured by ADEKA Corporation), SUMILIZER® BHT, SUMILIZER GA-80, SUMILIZER GS (manufactured by Sumitomo Chemical Co., Ltd.), Cyanox® 1790 (Cyanox 1790, manufactured by Cytec Industries Inc.), and vitamin E (manufactured by Eisai Co., Ltd.).

Examples of the phosphorus-based antioxidant include Irgafos® 168 (Irgafos 168: tris(2,4-di-t-butylphenyl)phosphite, manufactured by BASF Japan Ltd.), Irgafo12 (Irgafos 12: tris[2-[[2,4,8,10-tetra-t-butyldibenzo[d,f][1,3,2]-dioxaphosphine-6-yl]oxy]ethyl]amine, manufactured by BASF Japan Ltd.), Irgafos 38 (Irgafos 38: bis(2,4-bis(1,1-dimethylethyl)-6-methylphenyl)ethyl ester phosphite, BASF Japan Ltd.), ADK STAB® 329K, Irgafos PEP36, Irgafos PEP-8 (all manufactured by ADEKA Corporation), Sandstab P-EPQ (manufactured by Clariant AG), Weston® 618, Weston 619G (manufactured by GE), and Ultranox 626 (manufactured by GE).

Examples of the phosphorus/phenol composite antioxidant include SUMILIZER® GP (6-[3-(3-t-butyl-4-hydroxy-5-methylphenyl)propoxy]-2,4,8,10-tetra-t-butyldibenz[d,f][1.3.2]dioxaphosphepine) (manufactured by Sumitomo Chemical Co., Ltd.).

Examples of the sulfur-based antioxidant include dialkyl thiodipropionate compounds such as dilauryl thiodipropionate, dimyristyl thiodipropionate, and distearate thiodipropionate; and β-alkylmercaptopropionic acid ester compounds of polyols such as tetrakis[methylene(3-dodecylthio) propionate]methane.

The content ratio of the antioxidant (E) may be, for example, based on 100 parts by mass of the resin (B), 1 part by mass or more and 50 parts by mass or less and is preferably 5 parts by mass or more and 40 parts by mass or less, more preferably 7 parts by mass or more and 30 parts by mass or less, and still more preferably 11 parts by mass or more and 25 parts by mass or less from the viewpoint of the light emission amount and heat resistance.

[6] Leveling Agent (F)

Examples of the leveling agent (F) include a silicone-based surfactant, a fluorine-based surfactant, and a silicone-based surfactant having a fluorine atom. These may have a polymerizable group at its side chain. From the viewpoint of developability and emission intensity, the leveling agent (F) is preferably a fluorine-based surfactant or a silicone-based surfactant.

Examples of the silicone-based surfactant include a surfactant having a siloxane bond in its molecule. Specific examples thereof include Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA, and Toray Silicone SH8400 (trade name: manufactured by Dow Corning Toray Co., Ltd.); KP321, KP322, KP323, KP324, KP326, KP340, and KP341 (manufactured by Shin-Etsu Chemical Co., Ltd.); and TSF400, TSF401, TSF410, TSF4300, TSF4440, TSF4445, TSF-4446, TSF4452, and TSF4460 (manufactured by Momentive Performance Materials Inc.).

Examples of the fluorine-based surfactant include a surfactant having a fluorocarbon chain in its molecule. Specific examples thereof include Fluorad® FC430 and Fluorad FC431 (manufactured by Sumitomo 3M Limited); MEGAFACE® F142D, MEGAFACE F171, MEGAFACE F172, MEGAFACE F173, MEGAFACE F177, MEGAFACE F183, MEGAFACE F554, MEGAFACE F575, MEGAFACE R30, and MEGAFACE RS-718-K (manufactured by DIC Corporation); EFTOP® EF301, EFTOP EF303, EFTOP EF351, and EFTOP EF352 (manufactured by Mitsubishi Materials Electronic Chemicals Co., Ltd.); Surflon® 5381, Surflon 5382, Surflon SC101, and Surflon SC105 (manufactured by Asahi Glass Co., Ltd.); and E5844 (manufactured by Daikin Fine Chemical Laboratory).

Examples of the silicone-based surfactant having a fluorine atom include a surfactant having a siloxane bond and a fluorocarbon chain in its molecule. Specific examples thereof include MEGAFACE® R08, MEGAFACE BL20, MEGAFACE F475, MEGAFACE F477, and MEGAFACE F443 (manufactured by DIC Corporation).

The content ratio of the leveling agent (F) may be, for example, based on the total amount of the curable resin composition, 0.001% by mass or more and 1.0% by mass or less, preferably 0.005% by mass or more and 0.75% by mass or less, more preferably 0.01% by mass or more and 0.5% by mass or less, and still more preferably 0.05% by mass or more and 0.5% by mass or less. When the content ratio of the leveling agent (F) is within the above range, the flatness of the cured film can be further improved.

[7] Solvent (G)

The solvent (G) is not particularly limited as long as it dissolves the resin (B), the photopolymerizable compound (C), and the photopolymerization initiator (D), and any solvent which has been used conventionally in the art can be used. Examples of the solvent (G) include an ester solvent (a solvent which contains —COO— but does not contain —O— in its molecule), an ether solvent (a solvent which contains —O— but does not contain —COO— in its molecule), an ether ester solvent (a solvent which contains —COO— and —O— in its molecule), a ketone solvent (a solvent which contains —CO— but does not contain —COO— in its molecule), an alcohol solvent (a solvent which contains OH but does not contain —O—, —CO— nor —COO— in its molecule), an aromatic hydrocarbon solvent, an amide solvent, and dimethyl sulfoxide.

Examples of the ester solvent include methyl lactate, ethyl lactate, n-butyllactate, methyl 2-hydroxy isobutanoate, ethyl acetate, n-butylacetate, isobutylacetate, n-pentyl formate, isopentyl acetate, n-butylpropionate, isopropyl butyrate, ethyl butyrate, n-butylbutyrate, methyl pyruvate, ethyl pyruvate, propyl pyruvate, methyl acetoacetate, ethyl acetoacetate, cyclohexanol acetate, and γ-butyrolactone.

Examples of the ether solvent include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monopropyl ether, propylene glycol monobutyl ether, 3-methoxy-1-butanol, 3-methoxy-3-methylbutanol, tetrahydrofuran, tetrahydropyran, 1,4-dioxane, diethylene glycol dimethyl ether, diethylene glycol diethyl ether, diethylene glycol methyl ethyl ether, diethylene glycol dipropyl ether, diethylene glycol dibutyl ether, anisole, phenetol, and methyl anisole.

Examples of the ether ester solvent include methyl methoxyacetate, ethyl methoxyacetate, butyl methoxyacetate, methyl ethoxyacetate, ethyl ethoxyacetate, methyl 3-methoxypropionate, ethyl 3-methoxypropionate, methyl 3-ethoxypropionate, ethyl 3-ethoxypropionate, methyl 2-methoxypropionate, ethyl 2-methoxypropionate, propyl 2-methoxypropionate, methyl 2-ethoxy propionate, ethyl 2-ethoxypropionate, methyl 2-methoxy-2-methylpropionate, ethyl 2-ethoxy-2-methylpropionate, 3-butyl methoxyacetate, 3-methyl-3-butyl methoxyacetate, propylene glycol monomethyl ether acetate, propylene glycol monoethyl ether acetate, propylene glycol monopropyl ether acetate, ethylene glycol monomethyl ether acetate, ethylene glycol monoethyl ether acetate, diethylene glycol monoethyl ether acetate, and diethylene glycol monobutyl ether acetate.

Examples of the ketone solvent include 4-hydroxy-4-methyl-2-pentanone, acetone, 2-butanone, 2-heptanone, 3-heptanone, 4-heptanone, 4-methyl-2-pentanone, cyclopentanone, cyclohexanone, and isophorone.

Examples of the alcohol solvent include methanol, ethanol, propanol, butanol, hexanol, cyclohexanol, ethylene glycol, propylene glycol, and glycerin.

Examples of the aromatic hydrocarbon solvent include benzene, toluene, xylene, and mesitylene.

Examples of the amide solvent include N,N-dimethylformamide, N,N-dimethylacetamide, and N-methylpyrrolidone.

The solvent is preferably propylene glycol monomethyl ether acetate, ethyl lactate, propylene glycol monomethyl ether, ethyl 3-ethoxypropionate, ethylene glycol monomethyl ether, diethylene glycol monomethyl ether, diethylene glycol monoethyl ether, 4-hydroxy-4-methyl-2-pentanone, or toluene.

The solvent (G) is a component other than the solid content, and is a component also containing a solvent contained in, for example, the quantum dots (A), the resin (B), and the like. The content ratio of the solvent (G) is the ratio of the total mass of all the solvents contained in the composition to the total amount of the composition, and may be, for example, based on the total amount of the curable resin composition, 40% by mass or more and 95% by mass or less, preferably 55% by mass or more and 90% by mass or less. In other words, the solid content of the curable resin composition is preferably 5% by mass or more and 60% by mass or less, and more preferably 10% by mass or more and 45% by mass or less. When the content of the solvent (G) is within the above range, there is a tendency that the flatness of the composition layer at the time of coating becomes better and a cured film having an appropriate film thickness is easily formed.

[8] Light Scattering Agent (H)

The curable resin composition of the present invention may further contain a light scattering agent (H). Examples of the light scattering agent (H) include particles of metal or metal oxide, and glass particles. Examples of the metal oxide include $TiO_2$, $SiO_2$, $BaTiO_3$, and $ZnO$. The particle size of the light scattering agent (I) is, for example, 0.03 μm or more and 20 μm or less, preferably 0.05 μm or more and 1 μm or less, and still more preferably 0.05 μm or more and 0.5 μm or less.

The content ratio of the light scattering agent (H) may be, for example, based on the total amount of the solid content of the curable resin composition, 0.001% by mass or more and 50% by mass or less, and from the viewpoint of developability and emission intensity of the cured film, preferably 1% by mass or more and 30% by mass or less, and more preferably 2% by mass or more and 10% by mass or less. When the curable composition contains an organic solvent, the light scattering agent (H) may be dispersed in advance in a part of the organic solvent (G) using a dispersant (J) and used. Commercially available products may also be used as the dispersant (J).

Examples of the commercially available products include:

DISPERBYK-101, 102, 103, 106, 107, 108, 109, 110, 111, 116, 118, 130, 140, 154, 161, 162, 163, 164, 165, 166, 170, 171, 174, 180, 181, 182, 183, 184, 185, 190, 192, 2000, 2001, 2020, 2025, 2050, 2070, 2095, 2150, 2155; ANTI-TERRA-U, U100, 203, 204, 250, BYK-P104, P104S, P105, 220S, 6919; BYK-LPN6919, and 21116; LACTIMON and LACTIMON-WS; Bykumen; and the like, manufactured by BYK Japan KK;

SOLSPERSE-3000, 9000, 13000, 13240, 13650, 13940, 16000, 17000, 18000, 20000, 21000, 24000, 26000, 27000, 28000, 31845, 32000, 32500, 32550, 33500, 32600, 34750, 35100, 36600, 38500, 41000, 41090, 53095, 55000, 76500, and the like, manufactured by Lubrizol Japan Limited;

EFKA-46, 47, 48, 452, 4008, 4009, 4010, 4015, 4020, 4047, 4050, 4055, 4060, 4080, 4400, 4401, 4402, 4403, 4406, 4408, 4300, 4310, 4320, 4330, 4340, 450, 451, 453, 4540, 4550, 4560, 4800, 5010, 5065, 5066, 5070, 7500, 7554, 1101, 120, 150, 1501, 1502, 1503, and the like, manufactured by BASF Japan Ltd.; and AJISPER PA111, PB711, PB821, PB822, and PB824, manufactured by Ajinomoto Fine-Techno Co., Inc.

If necessary, the curable resin composition of the present invention may further contain an additive known in the art, such as a polymerization inhibitor, a filler, other polymeric compound, an adhesion promoter, a light stabilizer, or a chain transfer agent.

<Method for Producing Curable Resin Composition>

The method for producing the curable resin composition may include a step of mixing the quantum dots (A), the resin (B), the polymerizable compound (C), the photopolymerization initiator (D), the antioxidant (E), the leveling agent (F), and the solvent (G), and other components used as necessary.

The method for producing the curable resin composition of the present invention may include a step of preparing the resin (B). The obtained resin (B) is free of an aliphatic tertiary amine compound and an aliphatic quaternary ammonium salt compound, or contains at least one of an aliphatic tertiary amine compound and an aliphatic quaternary ammonium salt compound in an amount of less than 0.8% by mass based on the total amount of the solid content of the resin (B). In the step of preparing the resin (B), an amine compound is preferably not used as a reaction catalyst from the viewpoint of developability and emission intensity.

<Cured Film>

The cured film of the present invention can be obtained by applying the curable resin composition of the present invention to a substrate and curing by the action of light or heat. The cured film of the present invention may be formed on the entire surface of the substrate or may be formed on a part of the substrate (that is, a cured pattern). Examples of the method for forming a cured film on a part of the substrate include a photolithography method, an inkjet method, and a printing method. Of these, the photolithography method is preferable. The photolithography method is a method in which a curable resin composition of the present invention is applied to a substrate, dried as necessary to form a composition layer, and the composition layer is exposed to light through a photomask and developed.

Examples of a method for forming a cured film on the entire surface of a substrate include a method in which a curable resin composition of the present invention is applied to a substrate, dried as necessary to form a composition layer, and the composition layer is heated and/or the entire surface of the composition layer is exposed to light.

Examples of the substrate include a glass plate made from, for example, quartz glass, borosilicate glass, alumina silicate glass, soda lime glass of which the surface is coated with silica, or the like; a resin plate made from, for example, polycarbonate, polymethyl methacrylate, polyethylene terephthalate or the like; a substrate made from silicon; and a substrate produced by forming a thin film made from aluminum, silver or a silver/copper/palladium alloy or the like on a substrate.

The formation of a cured pattern using a photolithography method can be carried out using a known or conventional device or under known or conventional conditions. For example, it can be produced as follows.

First, the curable composition is applied onto a substrate, and then dried by heat-drying (prebaking) and/or drying under reduced pressure to remove volatile components including a solvent from the composition, thereby producing a composition layer. Examples of the coating method include a spin coating method, a slit coating method, and a slit and spin coating method.

The temperature to be employed in the case where heat-drying is carried out is preferably 30° C. to 120° C., more preferably 50° C. to 110° C. The heating time is preferably 10 seconds to 60 minutes, and more preferably 30 seconds to 30 minutes.

In the case where drying under reduced pressure is carried out, it is preferred to carry out the drying procedure under a pressure of 50 Pa to 150 Pa and at a temperature of 20° C. to 25° C.

The film thickness of the composition layer is not particularly limited, and may be selected appropriately depending on the desired film thickness of the cured pattern to be produced, and may be, for example, 0.5 μm or more and 20 μm or less, preferably 3 μm or more and 18 μm or less, and more preferably 5 μm or more and 16 μm or less.

Next, the composition layer is exposed to light through a photomask for forming a desired cured pattern. The pattern on the photomask is not particularly limited.

The light sources used for exposure are preferably a light source that emits light having a wavelength of 250 nm to 450 nm. For example, light in the vicinity of 436 nm, 408 nm, or 365 nm may be selectively extracted from the light having the wavelength according to the absorption wavelength of the polymerization initiator by a band-pass filter. Specific examples of the light source include a mercury lamp, a light-emitting diode, a metal halide lamp, and a halogen lamp.

A light-exposing device such as a mask aligner and a stepper is preferably used because the device is capable of irradiating a parallel light beam uniformly over the whole area of the exposed surface or aligning the photomask accurately to the substrate which has the composition layer formed thereon. The exposed composition layer is cured by polymerizing the polymerizable compound and the like contained in the composition layer.

By bringing the exposed composition layer into contact with a developing solution for development, the unexposed portion of the composition layer is dissolved and removed in the developer to obtain a cured pattern. Examples of the developer include an aqueous solution of an alkaline compound such as potassium hydroxide, sodium hydrogen carbonate, sodium carbonate and tetramethylammonium hydroxide; and organic solvents. The concentration of the alkaline compound in the aqueous solution is preferably 0.01% by mass or more and 10% by mass or less, and more preferably 0.03% by mass or more and 5% by mass or less. Examples of the organic solvent include the same as the solvent (G). Further, the developer may contain a surfactant.

The developing method may be any of a paddle method, a dipping method, a spray method and the like. Further, the substrate may be inclined at any degree during development.

The cured pattern obtained by development is preferably further subjected to heating (post-baking). The heating temperature is carried out is preferably 150° C. to 250° C., more preferably 160° C. to 235° C. The heating time is preferably 1 minute to 120 minutes, and more preferably 10 minutes to 60 minutes. By performing heating after development, polymerization of the unreacted polymerizable compound and the like contained in the cured pattern can be advanced, and therefore, a cured pattern having more excellent chemical resistance can be obtained.

By irradiating the cured film of the present invention with ultraviolet light or visible light, the cured film of the present invention can emit light having a wavelength different from that of the irradiation light. The wavelength of light to be emitted can be selected by selecting the components and the particle size of the quantum dots in the curable resin composition used for forming the cured film of the present invention.

Since the cured film of the present invention has a function of converting the wavelength of irradiation light as described above, it can be used as a color conversion layer of a display device. Examples of such a display device include display devices disclosed in Japanese Patent Laid-Open No. 2006-309219, Japanese Patent Laid-Open No. 2006-310303, Japanese Patent Laid-Open No. 2013-15812, Japanese Patent Laid-Open No. 2009-251129, and Japanese Patent Laid-Open No. 2014-2363.

The cured film of the present invention can easily reduce the amount of outgas released by heating. The amount of outgas can be evaluated as a weight change rate (%) [=([weight after heating]/[weight before heating])×100] when the cured film is heated at 180° C. for 60 minutes according to the method described in the section of Examples below. The cured film of the present invention may have a weight change rate (%) of, for example, 1% or less, or 0.5% or less. From the viewpoint of easily reducing contamination of the device in a subsequent step, the content is preferably 0.8% or less, more preferably 0.6% or less, still more preferably 0.4% or less, particularly preferably 0.2% or less, and is usually 0% or more, and for example, may be 0.01% or more or 0.05% or more.

The cured film of the present invention can exhibit excellent solvent resistance. The solvent resistance can be evaluated according to the method described in the section of Examples as the change rate in emission intensity when the cured film is immersed in propylene glycol monomethyl ether acetate (PGMEA) for 30 minutes. In the cured film of the present invention, the change rate in the emission intensity may be, for example, 88% or more, and is preferably 90% or more, more preferably 92% or more, still more preferably 94% or more, particularly preferably 96% or more, more particularly preferably 98% or more, and usually 100% or less from the viewpoint of enhancing brightness.

The cured film of the present invention preferably has a weight change rate (%) of 0.8% or less when the cured film is heated at 180° C. for 60 minutes and a change rate in emission intensity of 92% or more when the cured film is immersed in PGMEA for 30 minutes. The cured film of the present invention preferably has a weight change rate (%) of 0.4% or less when the cured film is heated at 180° C. for 60 minutes and a change rate in emission intensity of 88% or more when the cured film is immersed in PGMEA for 30 minutes. Further, the cured film of the present invention particularly preferably has a weight change rate (%) of 0.4% or less when the cured film is heated at 180° C. for 60 minutes and a change rate in emission intensity of 92% or more when the cured film is immersed in PGMEA for 30 minutes.

The curable resin composition of the present invention is useful as a color conversion layer for a display device, especially a liquid crystal display device, because there is a tendency that a film having a high development speed and a high emission intensity can be obtained even in a thick film.

EXAMPLES

Hereinafter, the present invention will be described in more detail by way of examples. Unless otherwise specified, "%" and "part" in the example are % by mass and parts by mass.

[Evaluation of Developability]

Onto a 5-cm square glass substrate (Eagle 2000; manufactured by Corning Incorporated), a curable resin composition was applied by a spin coat method so that the film thickness set to 10 μm, and then prebaked at 100° C. for 3 minutes, to form a curable resin composition layer, and then developed by immersion in a developer (0.05% aqueous solution of potassium hydroxide). The time during which the curable resin composition layer was completely removed was measured.

[Measurement of Emission Intensity]

Onto a 5-cm square glass substrate (Eagle 2000; manufactured by Corning Incorporated), a curable resin composition was applied by a spin coat method so that the film thickness set to 10 μm, and then prebaked at 100° C. for 3 minutes, to form a curable composition layer. This curable composition layer was subjected to light irradiation in an exposure amount (basis: 365 nm) of 80 mJ/cm$^2$ under an air atmosphere using an exposure device (TME-150RSK; manufactured by TOPCON CORPORATION) and after development, post-baking was performed 180° C. for 60 minutes, to obtain a substrate having a cured film.

A narrow directional angle type sensing backlight illumination (OPF series; manufactured by OPTEX FA CO., LTD.) equipped with an LED lamp having an emission wavelength of 444 nm and a scratch resistant cover was prepared as a backlight. A backlight was placed with the scratch-resistant cover facing upward, a black film with a hole was placed on the scratch-resistant cover to prevent light leakage at locations other than the measurement location, and an optical fiber connected to the following spectrometer was placed at a height of 4 cm from the surface of the scratch-resistant cover to detect light emission. A glass substrate (Eagle 2000; manufactured by Corning Incorporated) as a reference was placed on the surface of the scratch resistant cover of the backlight. In this state, the backlight was turned on, and the light amount of the backlight was adjusted so that the total radiant flux (μW) of the backlight was 1500 μW through a reference glass substrate (Eagle 2000; manufactured by Corning Incorporated).

Next, the substrate having the cured film prepared above was disposed on the surface of the glass substrate. In this state, the backlight was turned on, and the emission intensity (unit: μW) of the light emitted from the cured film was measured as an integrated radiant flux in a range of wavelengths of 485 nm or more and 780 nm or less. The emission intensity was measured using a spectrum analyzer (Spectrum meter, manufactured by Ocean Optics, Inc).

[Evaluation Method of Outgas]

After the cured film was prepared in the same manner as in the above [Measurement of emission intensity], the film portion (film thickness=10 μm) was peeled off, and the film was held at 180° C. for 60 min by TGDTA [high-performance thermal analyzer NEXTA® STA200 (manufactured by Hitachi High-Tech Corporation)], and the weight change rate (%) [=([weight after heating]/[weight before heating])× 100] was determined.

[Evaluation Method of Solvent Resistance]

After preparing a cured film in the same manner as in the above [Measurement of emission intensity], the film was immersed in PGMEA for 30 minutes. The emission intensity before and after immersion was measured, and the change rate in emission intensity before and after immersion was calculated.

[Weight-Average Molecular Weight]

The weight-average molecular weight (Mw) of the resin was measured by the GPC method under the following conditions.

Equipment: K2479 (manufactured by Shimadzu Corporation)
Column: SHIMADZU Shim-pack GPC-80M
Column temperature: 40° C.
Solvent: tetrahydrofuran
Flow rate: 1.0 mL/min
Detector: RI
Standard for calibration; TSK STANDARD POLYSTYRENE F-40, F-4, F-288, A-2500, A-500 (manufactured by Tosoh Corporation)

[Acid Value]

Three grams of the resin solution was precisely weighed, dissolved in a mixed solvent of 90 g of acetone and 10 g of water, and the acid value of the polymer solution was measured by an automatic titrator (manufactured by HIRANUMA Co., Ltd., trade name: COM-555) using the KOH aqueous solution specified in 0.1 as the titrant, and the acid value (AV) per 1 g of solid content was determined from the acid value of the solution and the solid content of the solution.

[Solid Content]

About 1 g of the polymer solution was weighed in an aluminum cup, dried at 180° C. for 1 hour, and then the mass was measured. The solid content (% by mass) of the polymer solution was calculated from the mass reduction amount.

[Contents of Aliphatic Tertiary amine compound and Aliphatic Quaternary Ammonium Salt Compound]

<Equipment Name, Measurement Conditions>

Equipment: Thermo Fisher Scientific ICS-1500
Separation Column: IonPac CG14+CS14 (4 mm)
Column temperature: 30° C.
Eluent: 10 mM methanesulfonic acid
Flow rate: 1 mL/min
Detector: Electrical conductivity detector <Pretreatment Method>

In THF, 0.1 gram of the sample was dissolved and the volume was adjusted to 10 mL with pure water. After filtration, the filtrate was further diluted with pure water to prepare a test solution.

Production Example 1: Quantum Dot Dispersion (A-1)

A toluene dispersion of InP/ZnSeS quantum dots coordinated with oleic acid as a ligand was prepared. The dispersion was distilled under reduced pressure to remove toluene. To 30 parts of the solid content, 70 parts of cyclohexyl acetate was added to obtain a quantum dot dispersion (A-1) (solid content: 30%).

Production Example 2: Light Scattering Agent (H-1)

To 70 parts by mass of titanium oxide nanoparticles, 3 parts by mass of DISPERBYK21116 (manufactured by BYK Japan KK) as a solid content was added and PGMEA was added so that the total amount was 100 parts by mass, and the mixture was stirred with a paint shaker until it was sufficiently dispersed to obtain a dispersion (solid content: 73%) of a scattering agent (H-1).

Synthesis Example 1: Resin (B-1)

After 110 parts by mass of propylene glycol monomethyl ether acetate (hereinafter referred to as "PGMEA") were put into a flask equipped with a stirrer, a reflux cooling tube with a thermometer, a dropping funnel, and a nitrogen introduction tube, the mixture was stirred while replacing nitrogen, and the temperature was raised to 80° C. A solution obtained by dissolving 25 parts by mass of dicyclopentanyl methacrylate, 26 parts by mass of methyl methacrylate, 16 parts by mass of methacrylic acid, and 14 parts by mass of 2,2'-azobis(2,4-dimethylvaleronitrile) in 110 parts by mass of PGMEA was dropped from a dropping funnel into a flask, and stirred at 80° C. for 3 hours.

Next, 16 parts by mass of glycidyl methacrylate, 0.4 parts by mass of 2,2'-methylenebis(4-methyl-6-t-butylphenol), and 0.8 parts by mass of triphenylphosphine were put into a flask, and the temperature was raised to 110° C. and stirred for 8 hours to react the carboxylic acid in the polymer with the epoxy group to introduce a polymerizable unsaturated bond. Then, 17 parts by mass of 1,2,3,6-tetrahydrophthalic acid anhydride was added and the reaction was continued for 3 hours to introduce carboxylic acid groups into the side chains. The reaction solution was cooled to room temperature to obtain a resin (B-1) solution.

The resin (B-1) had a weight-average molecular weight of 5200 and an acid value of 100 mg KOH/g, and the solid content in the resin (B-1) solution was 40% by mass.

Synthesis Example 2: Resin (B-2)

A resin (B-2) solution was prepared in the same manner as in Synthetic Example 1 except that 12.5 parts by mass of 2,2'-azobis(2,4-dimethylvaleronitrile) was used.

Synthesis Example 3: Resin (B-3)

A resin (B-3) solution was prepared in the same manner as in Synthetic Example 1 except that 11 parts by mass of 2,2'-azobis(2,4-dimethylvaleronitrile) was used.

Synthesis Example 4: Resin (B-4)

A resin (B-4) solution was prepared in the same manner as in Synthetic Example 1 except that 23 parts by mass of methyl methacrylate, 19 parts by mass of methacrylic acid, and 10 parts by mass of 2,2'-azobis(2,4-dimethylvaleronitrile) was used.

Synthesis Example 5: Resin (B-5)

After 110 parts by mass of propylene glycol monomethyl ether acetate (hereinafter referred to as "PGMEA") were put into a flask equipped with a stirrer, a reflux cooling tube with a thermometer, a dropping funnel, and a nitrogen introduction tube, the mixture was stirred while replacing nitrogen, and the temperature was raised to 80° C. A solution obtained by dissolving 25 parts by mass of dicyclopentanyl methacrylate, 21 parts by mass of methyl methacrylate, 26 parts by mass of methacrylic acid, and 10 parts by mass of 2,2'-azobis(2,4-dimethylvaleronitrile) in 110 parts by mass of PGMEA was dropped from a dropping funnel into a flask, and stirred at 80° C. for 3 hours.

Next, 16 parts by mass of glycidyl methacrylate, 0.4 parts by mass of 2,2'-methylenebis(4-methyl-6-t-butylphenol), and 0.8 parts by mass of triethylamine were put into a flask, and the temperature was raised to 110° C. and stirred for 8 hours to react the carboxylic acid in the polymer with the epoxy group to introduce a polymerizable unsaturated bond. The reaction solution was cooled to room temperature to obtain a resin (B-5) solution. The content ratio of triethylamine in the resin (B-5) was 0.8% by mass based on the total amount of the solid content of the resin (C-5).

Synthesis Example 6: Resin (B-6)

A flask equipped with a cooling tube and a stirrer was charged with 150 parts by mass of propylene glycol monomethyl ether acetate and purged with nitrogen. The flask was heated to 80° C., and a mixture solution of 50 parts by mass of propylene glycol monomethyl ether acetate, 30 parts by mass of 2-methacryloyloxyethyl succinate, 10 parts by mass of benzyl methacrylate, 60 parts by mass of 2-ethylhexyl methacrylate, and 6 parts by mass of 2,2'-azobis(2,4-dimethylvaleronitrile) was added dropwise at the same temperature for 2 hours, and polymerization was performed for 1 hour while maintaining the temperature. Then, the temperature of the reaction solution was raised to 90° C., and the mixture was further polymerized for 1 hour to obtain a resin (B-6) solution. The resin (B-6) had an Mw of 11000 and an acid value of 70, and the resin (B-6) solution had a solid content concentration of 33% by mass.

The weight-average molecular weight, the molecular weight distribution, the acid value, the acrylic equivalent, and the contents of the aliphatic tertiary amine and the aliphatic quaternary ammonium salt compound of the resins (B-1) to (B-6) are shown in Table 1 below.

TABLE 1

| | B-1 | B-2 | B-3 | B-4 | B-5 | B-6 |
|---|---|---|---|---|---|---|
| Weight-average molecular weight | 5200 | 6500 | 7600 | 8400 | 8200 | 11000 |
| Molecular weight distribution | 2.3 | 2.2 | 2.1 | 2.2 | 1.9 | 1.8 |
| Acid value [mg KOH/g] | 100 | 100 | 100 | 120 | 110 | 70 |
| Acrylic equivalent [g/eq] | 870 | 860 | 840 | 840 | 870 | 0 |
| Contents [%] of aliphatic tertiary amine and aliphatic quaternary ammonium salt compound (in solid content of resin(B)) | 0 | 0 | 0 | 0 | 0.8 | 0 |

Examples 1 to 9, Comparative Example 1

Each component in Table 2 was mixed to prepare curable resin compositions of Examples and Comparative Examples. The emission intensity and developing time of the obtained curable resin composition were evaluated. The results are shown in Table 3.

TABLE 2

|  |  | Example ||||||||| Comparative Example |
|---|---|---|---|---|---|---|---|---|---|---|---|
|  |  | 1 | 2 | 3 | 4 | 5 | 6 | 7 | 8 | 9 | 1 |
| Quantum dots (A) | A-1 | 20 | 20 | 20 | 20 | 20 | 20 | 20 | 20 | 20 | 20 |
| Resin (B) | B-1 | 51.5 | — | — | — | — | — | — | — | — | — |
|  | B-2 | — | 51.5 | — | — | — | — | — | — | — | — |
|  | B-3 | — | — | 51.5 | 51.5 | 51.5 | — | — | — | 51.5 | — |
|  | B-4 | — | — | — | — | — | 51.5 | 51.5 | — | — | — |
|  | B-5 | — | — | — | — | — | — | — | 51.5 | — | — |
|  | B-6 | — | — | — | — | — | — | — | — | — | 51.5 |
| Photopolymerizable compound (C) | C-1 | 17.2 | 17.2 | 17.2 | 6.9 | 6.9 | 17.2 | 17.2 | 17.2 | 6.9 | 17.2 |
|  | C-2 | — | — | — | 10.3 | 10.3 | — | — | — | 10.3 | — |
| Photopolymerization initiator (D) | D-1 | 2.1 | 2.1 | 2.1 | 2.1 | 2.1 | 2.1 | 2.1 | 2.1 | — | 2.1 |
|  | D-2 | — | — | — | — | — | — | — | — | 2.1 | — |
| Antioxidant (E) | E-1 | 4.1 | 4.1 | 4.1 | 4.1 | 4.1 | 4.1 | — | — | 4.1 | 4.1 |
|  | E-2 | — | — | — | — | — | — | 4.1 | 4.1 | — | — |
| Leveling agent (F) | F-1 | 0.1 | 0.1 | 0.1 | 0.1 | — | 0.1 | 0.1 | 0.1 | — | 0.1 |
|  | F-2 | — | — | — | — | 0.1 | — | — | — | 0.1 | — |
| Solvent (G) | G-1 | 186 | 186 | 186 | 186 | 186 | 186 | 186 | 186 | 186 | 186 |
|  | G-2 | 47 | 47 | 47 | 47 | 47 | 47 | 47 | 47 | 47 | 47 |
| Scattering agent (H) | H-1 | 5 | 5 | 5 | 5 | 5 | 5 | 5 | 5 | 5 | 5 |
| Contents [% by mass] of aliphatic tertiary amine and aliphatic quaternary ammonium salt compound (in terms of solid content of curable resin composition) |  | 0 | 0 | 0 | 0 | 0 | 0 | 0 | 0.4 | 0 | 0 |

Unit: % by mass (the solid content of the curable resin composition is set to 100%)
(the values of the quantum dots (A), the scattering agent (B), and the resin (C) do not include the solvent)
Photopolymerizable compound (C-1): M-510 (polybasic modified acrylate, manufactured by Toagosei Co., Ltd.)
Photopolymerizable compound (C-2): A-9550 (dipentaerythritol polyacrylate, manufactured by SHIN-NA-KAMURA CHEMICAL Co., Ltd.)
Photopolymerization initiator (D-1): OXE01 (manufactured by BASF Japan Ltd.)
Photopolymerization initiator (D-2): Omnirad 907 (manufactured by IGM Resins B.V.)
Antioxidant (E-1): SUMILIZER-GP (phosphorus/phenol composite, antioxidant, manufactured by Sumitomo Chemical Co., Ltd.)
Antioxidant (E-2): AO-60 (phenol-based antioxidant, manufactured by ADEKA Corporation)
Leveling agent (F-1): SH8400 (silicone-based leveling agent, manufactured by Dow Corning Toray Co., Ltd.)
Leveling agent (F-2): F-554 (fluorine-based leveling agent, manufactured by DIC Corporation)
Solvent (G-1): PGMEA (propylene glycol monomethyl ether acetate)
Solvent (G-2): cyclohexyl acetate

TABLE 3

|  | Example ||||||||| Comparative Example |
|---|---|---|---|---|---|---|---|---|---|---|
|  | 1 | 2 | 3 | 4 | 5 | 6 | 7 | 8 | 9 | ple 1 |
| Emission intensity | 151 | 153 | 152 | 155 | 160 | 132 | 124 | 120 | 158 | 97 |
| Developing time (sec) | 107 | 100 | 98 | 91 | 89 | 125 | 126 | 125 | 87 | >180 |
| Outgas [weight change rate (%)] | 0.8 | 0.6 | 0.4 | 0.2 | 0.2 | 0.2 | 0.2 | 0.1 | 0.7 | 0.5 |
| Solvent resistance (%) | 92 | 94 | 95 | 98 | 97 | 96 | 90 | 89 | 92 | 87 |

The invention claimed is:

1. A curable resin composition comprising: quantum dots (A); a resin (B); a photopolymerizable compound (C); a photopolymerization initiator (D); an antioxidant (E); a leveling agent (F); and a solvent (G), wherein the resin (B) has a weight-average molecular weight in terms of polystyrene of less than 10000 and an acid value of 90 mg KOH/g or more and 150 mg KOH/g or less, and an acrylic equivalent of 300 g/eq or more and 2000 g/eq or less, wherein a mass ratio of the resin (B) to the photopolymerizable compound (C) is 2 or more, wherein the antioxidant (E) comprises a phosphorus/phenol composite antioxidant, and wherein a content ratio of the antioxidant (E), based on 100 parts by mass of the resin (B), is 7 parts by mass or more and 30 parts by mass or less.

2. The curable resin composition according to claim 1, wherein the photopolymerization initiator (D) comprises an oxime compound.

3. The curable resin composition according to claim 1, wherein the leveling agent (F) comprises a fluorine-based surfactant or a silicone-based surfactant.

4. The curable resin composition according to claim 1, wherein the curable resin composition is free of an aliphatic tertiary amine compound and an aliphatic quaternary ammonium salt compound, or comprises at least one of an aliphatic tertiary amine compound and an aliphatic quaternary ammonium salt compound in an amount of less than 0.4% by mass based on a total amount of a solid content of the curable resin composition.

5. A cured film formed from the curable resin composition according to claim 1.

6. A display device comprising the cured film according to claim 5.

7. A method for producing the curable resin composition according to claim 1, comprising:
 a step of preparing the resin (B),
 wherein the resin (B) is free of an aliphatic tertiary amine compound and an aliphatic quaternary ammonium salt compound, or contains at least one of an aliphatic tertiary amine compound and an aliphatic quaternary ammonium salt compound in an amount of less than 0.8% by mass based on a total amount of a solid content of the resin (B).

8. The production method according to claim 7, wherein an amine compound is not used as a reaction catalyst in the step of preparing the resin (B).

* * * * *